United States Patent
Bhat et al.

(10) Patent No.: US 11,142,072 B2
(45) Date of Patent: Oct. 12, 2021

(54) ELECTRIFIED VEHICLE WITH ELECTRICAL POWER OUTLET

(71) Applicant: Ford Global Technologies, LLC, Dearborn, MI (US)

(72) Inventors: Krishna Prasad Bhat, Canton, MI (US); Michael W. Degner, Novi, MI (US); Ke Zou, Canton, MI (US); Xi Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/596,142

(22) Filed: Oct. 8, 2019

(65) Prior Publication Data

US 2021/0104851 A1   Apr. 8, 2021

(51) Int. Cl.
| | |
|---|---|
| *B60L 1/00* | (2006.01) |
| *H01R 27/00* | (2006.01) |
| *H01R 13/66* | (2006.01) |
| *H01R 13/74* | (2006.01) |
| *B60L 50/60* | (2019.01) |
| *B60K 6/28* | (2007.10) |

(52) U.S. Cl.
CPC ............... *B60L 1/006* (2013.01); *B60L 50/60* (2019.02); *H01R 13/6683* (2013.01); *H01R 13/74* (2013.01); *H01R 27/00* (2013.01); *B60K 6/28* (2013.01); *B60Y 2200/91* (2013.01); *B60Y 2200/92* (2013.01); *H01R 2201/26* (2013.01)

(58) Field of Classification Search
CPC . B60L 1/00; B60L 50/00; B60L 53/00; H01R 27/00; H01R 13/00; H01R 25/00; B60Y 2200/00; H02G 3/00
See application file for complete search history.

(56) References Cited

U.S. PATENT DOCUMENTS

| | | | |
|---|---|---|---|
| 5,460,542 A * | 10/1995 | Castellani | H01R 25/006 439/535 |
| 9,425,696 B2 | 8/2016 | Waffenschmidt et al. | |
| 9,884,562 B2 | 2/2018 | Yamamoto | |
| 10,836,371 B1 * | 11/2020 | Thiruvengadam | B60W 10/08 |
| 10,875,406 B2 * | 12/2020 | Galin | H02J 3/382 |
| 2010/0099287 A1 * | 4/2010 | Colburn | H01R 27/00 439/224 |
| 2010/0117453 A1 * | 5/2010 | Langgood | H01R 13/447 307/75 |

(Continued)

FOREIGN PATENT DOCUMENTS

| | | | | |
|---|---|---|---|---|
| CA | 3036905 A1 * | 3/2019 | | H02M 1/10 |
| CA | 3036905 A1 | 3/2019 | | |

*Primary Examiner* — Hal Kaplan
*Assistant Examiner* — Joseph N Inge
(74) *Attorney, Agent, or Firm* — David B Kelley; Brooks Kushman P.C.

(57) ABSTRACT

A vehicle includes a power-electronics converter and an electrical outlet in electric communication with the power-electronics converter and configured to power external loads. The vehicle includes at least one electrical outlet including at least a first socket configured to power a first category of external loads and a second socket configured to power a second category of external loads. The vehicle is configured to only power one of the first and second loads at a time. This may be accomplished using physical features or electronically.

20 Claims, 5 Drawing Sheets

(56) References Cited

U.S. PATENT DOCUMENTS

| | | | |
|---|---|---|---|
| 2010/0291786 A1* | 11/2010 | Hopwood | H01R 13/639 439/345 |
| 2014/0311138 A1* | 10/2014 | Renner | B66C 13/18 60/327 |
| 2015/0137751 A1* | 5/2015 | King | B60L 50/51 320/109 |
| 2016/0185241 A1 | 6/2016 | Kinomura | |
| 2016/0190744 A1* | 6/2016 | Steinbuchel, IV | H01R 13/64 439/34 |
| 2017/0246700 A1* | 8/2017 | Jochman | F02B 63/06 |
| 2017/0324195 A1* | 11/2017 | Eriksen | H01R 13/7135 |
| 2018/0056902 A1* | 3/2018 | Trinkner | B23K 9/1006 |
| 2018/0059175 A1* | 3/2018 | Hase | G01R 21/06 |
| 2018/0193545 A1* | 7/2018 | Crnkovich | A61M 1/14 |
| 2019/0013766 A1* | 1/2019 | Stach | H02J 7/35 |
| 2019/0148929 A1* | 5/2019 | Wang | H02H 3/162 361/42 |
| 2020/0108819 A1* | 4/2020 | Revach | B60W 20/13 |

* cited by examiner

ELECTRIFIED VEHICLE WITH ELECTRICAL POWER OUTLET

TECHNICAL FIELD

This disclosure relates to electrified vehicles with capacity to act as mobile generators and more specifically to vehicles that include at least one electrical power outlet connected to vehicle power electronics and configured to power remote devices (V2L), building (V2B), and/or the power grid (V2G).

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes a power-electronics converter and an electrical outlet in electric communication with the power-electronics converter and configured to power external loads. The electrical outlet including a first socket configured to power a first category of external loads and a second socket configured to power a second category of external loads. The first socket has receptacles arranged to receive prongs of a first type of connector that is associated with the first category of external loads. The second socket has receptacles arranged differently than the first socket to receive prongs of a second type of connector that is associated with the second category of external loads. The first and second sockets are positioned on the outlet to overlap such that only one of the first and second connectors can be plugged into the outlet at a time to prevent the power-electronics converter from powering the first and second categories of external loads simultaneously.

According to another embodiment, a vehicle includes a traction battery, an electric machine, a power-electronics converter configured to transfer power between the traction battery and the electric machine, and an electrical outlet in electric communication with the power-electronics converter and configured to power external loads. The electrical outlet including a National Electrical Manufacturers Association (NEMA) 5 socket configured to power loads of remote devices, and a unique socket configured to power a building. The NEMA 5 socket and the unique socket are positioned on the outlet to overlap such that only one plug is receivable into the outlet at a time to prevent the power-electronics converter from powering remote devices and buildings simultaneously.

According to yet another embodiment, a vehicle includes a traction battery, an electric machine, and a power-electronics converter configured to transfer power between the traction battery and the electric machine. The vehicle further includes a first outlet configured to power a building with the converter and a second outlet configured to power a remote device with the converter. A vehicle controller is programmed to, responsive to a plug being inserted into the first outlet, de-energize the second outlet and connect the first outlet to earth ground, and, responsive to the plug being removed from the first outlet, energize the second outlet and connect the second outlet to vehicle ground.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
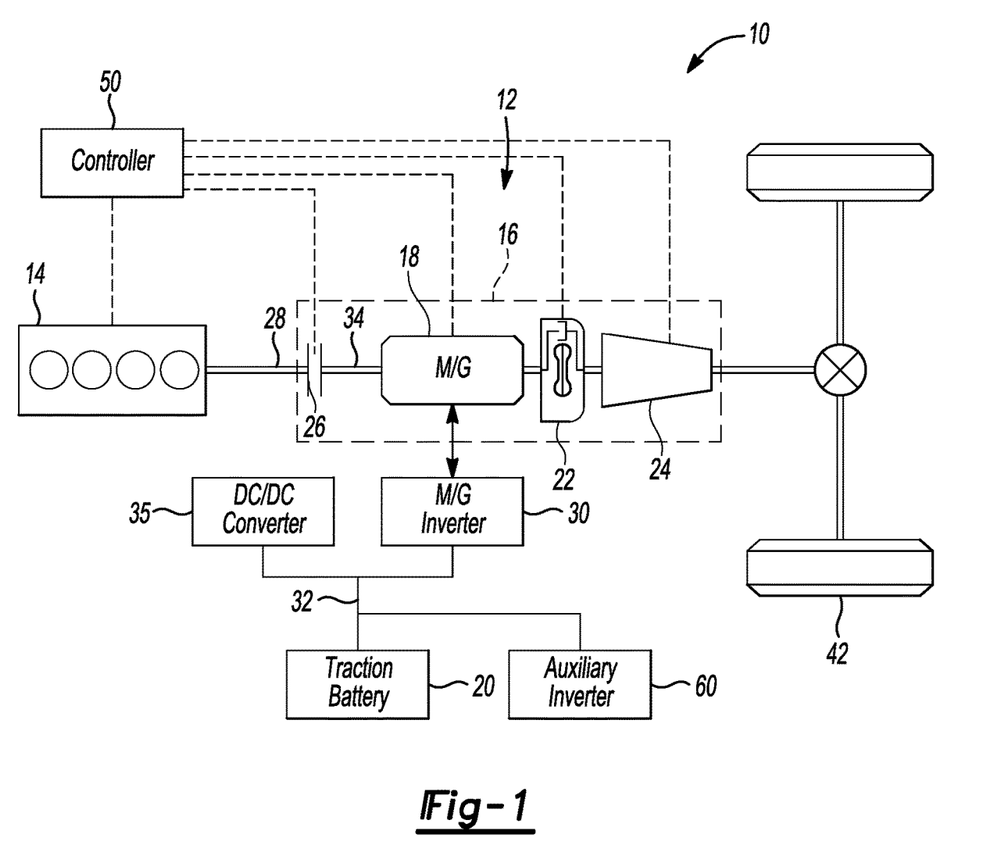
FIG. 1 is a schematic diagram of a hybrid vehicle having an auxiliary power system.

Referring to FIG. 1, a schematic diagram of a hybrid-electric pickup vehicle 10 is illustrated according to an embodiment of the present disclosure. The vehicle may be a pickup truck. The pickup truck 10 includes an auxiliary power system that allows the truck 10 to be used as a mobile generator. FIG. 1 illustrates representative relationships among the components. Physical placement and orientation of the components within the vehicle may vary. The truck 10 includes a powertrain 12. The powertrain 12 may include an engine 14 that drives a transmission 16, which may be referred to as a modular hybrid transmission (MHT). As will be described in further detail below, the transmission 16 may include an electric machine such as an electric motor/generator (M/G) 18, an associated traction battery 20, a torque converter 22, and a multiple step-ratio automatic transmission or gearbox 24. For simplicity, the M/G 18 may be referred to as a motor. The engine 14, M/G 18, torque converter 22, and the gear box 24 may be connected sequentially in series, as illustrated in FIG. 1.

The engine 14 and the M/G 18 are both drive sources for the truck 10 and may be referred to as actuators. The engine 14 generally represents a power source that may include an internal-combustion engine such as a gasoline, diesel, or natural gas engine. The engine 14 generates engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

The M/G 18 is powered by a traction battery 20. The traction battery 20 stores energy in a plurality of individual battery cells connected together to provide a desired voltage and charge capacity for the M/G 18. In one embodiment, traction battery 20 includes an array of lithium-ion battery cells. The traction battery 20 typically provides a high-voltage direct current (DC) output to a high-voltage bus 32, although the voltage and current may vary depending on particular operating conditions and loads. The traction battery 20 is electrically connected to an M/G power inverter 30, and a DC/DC converter 35, for example. The power inverter 30 converts DC power from the battery to AC power for use with the electric machines. For example, power electronics may provide three-phase alternating current (AC) to the M/G 18. The power inverter 30 is also capable of acting as a rectifier. The DC/DC converter 35 is configured to convert the high-voltage DC output of the traction battery 20 to a low-voltage DC supply that is compatible with other vehicle loads that may be directly connected thereto. The inverter 30 may include an inductor configured to step-up or step down current and voltage.

One or more contactors may isolate the traction battery 20 from other components when open and connect the traction battery 20 to the other components when closed. The traction battery 20 may include various internal circuits for measuring and monitoring various operating parameters including cell current and individual cell voltage. Parameters such as voltage, current and resistance for a battery cell or a group of battery cells (sometimes referred to an array) may be monitored and/or controlled by a vehicle controller 50.

Vehicle 10 may also include an auxiliary battery having a relatively lower nominal voltage (such as 24V or 48V, for example) and may be implemented using different battery chemistries than the traction battery 20. The auxiliary battery may also be referred to as a low-voltage battery, starter battery or simply the vehicle battery for various applications. The auxiliary battery may be used to power various low-voltage components, controllers, modules, motors, actuators, sensors, etc.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 34 into electrical energy to be stored in the battery 20 or used by vehicle systems such as an auxiliary electrical system. The disconnect clutch 26 can also be disengaged to isolate the engine 14 from the remainder of the powertrain 12 such that the M/G 18 can act as the sole drive source for the truck 10. The M/G 18 is continuously, drivably connected to the shaft 34, whereas the engine 14 is drivably connected to the shaft 34 only when the disconnect clutch 26 is at least partially engaged. When the disconnect clutch 26 is locked (fully engaged), the crankshaft 28 is fixed to the shaft 34.

The vehicle 10 includes an auxiliary power inverter 60 connected to the high-voltage bus 32. The inverter 60 is configured to converter the DC power of the bus 32 to AC power that is compatible with the auxiliary-power system for powering external loads. The inverter 60 is also configured to stepdown the voltage of the bus 32 to voltages compatible with the auxiliary power system such as common wall voltages 120 and/or 240.

It should be understood that the schematic illustrated in FIG. 1 is merely exemplary and is not intended to be limiting. Other series-hybrid configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Further, the truck 10, in other embodiments, may include a parallel-hybrid configured (also known as a split hybrid). In some embodiments, the truck 10 may be a pure-electric vehicle.

The vehicle 10 includes one or more controller 50 such as a powertrain control unit (PCU), an engine control module (ECM), a motor control unit (MCU), and a DC/AC inverter controller (DCACA). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above.

Pickup trucks are frequently used on constructions sites as well as at the home by contractors and individuals. Construction sites typically require electricity to power tools and the like. Available power sources, however, are often scarce. Therefore, mobile gas generators are commonly bought onto construction sites. These mobile generators are bulky, take-up storage space, and are difficult to move. Providing electrical power with a drivable vehicle overcomes many limitations of mobile gas generators. While vehicles are available with AC outlets, their 12-volt batteries have limited capacity as do their alternators. The vehicle 10, in contrast, has a large traction battery 20 and an M/G 18, which allows the vehicle to act as a mobile generator for powering auxiliary loads, such as power tools and buildings, for an extended period of time.

The vehicle 10 may be configured to power a variety of categories of external loads. In this field, loads have been classified into three categories including vehicle-to-load (V2L), vehicle-to-building (V2B), and vehicle-to-grid (V2G). V2L includes remote devices such as those commonly plugged into standard wall outlets. A non-exhaustive list of remote devices includes power tools, lights welders, pumps, vacuums, chargers, and the like. V2B includes houses, building, and the like. V2G refers to connecting the vehicle to the electrical power grid. Each of these different categories of loads may have different standards including different grounding requirements and types of outlets/connectors. For example, V2B loads require grounding to earth, e.g., a grounding stake, whereas V2L does not (the vehicle chassis may be the ground for V2L).

Figure 2:
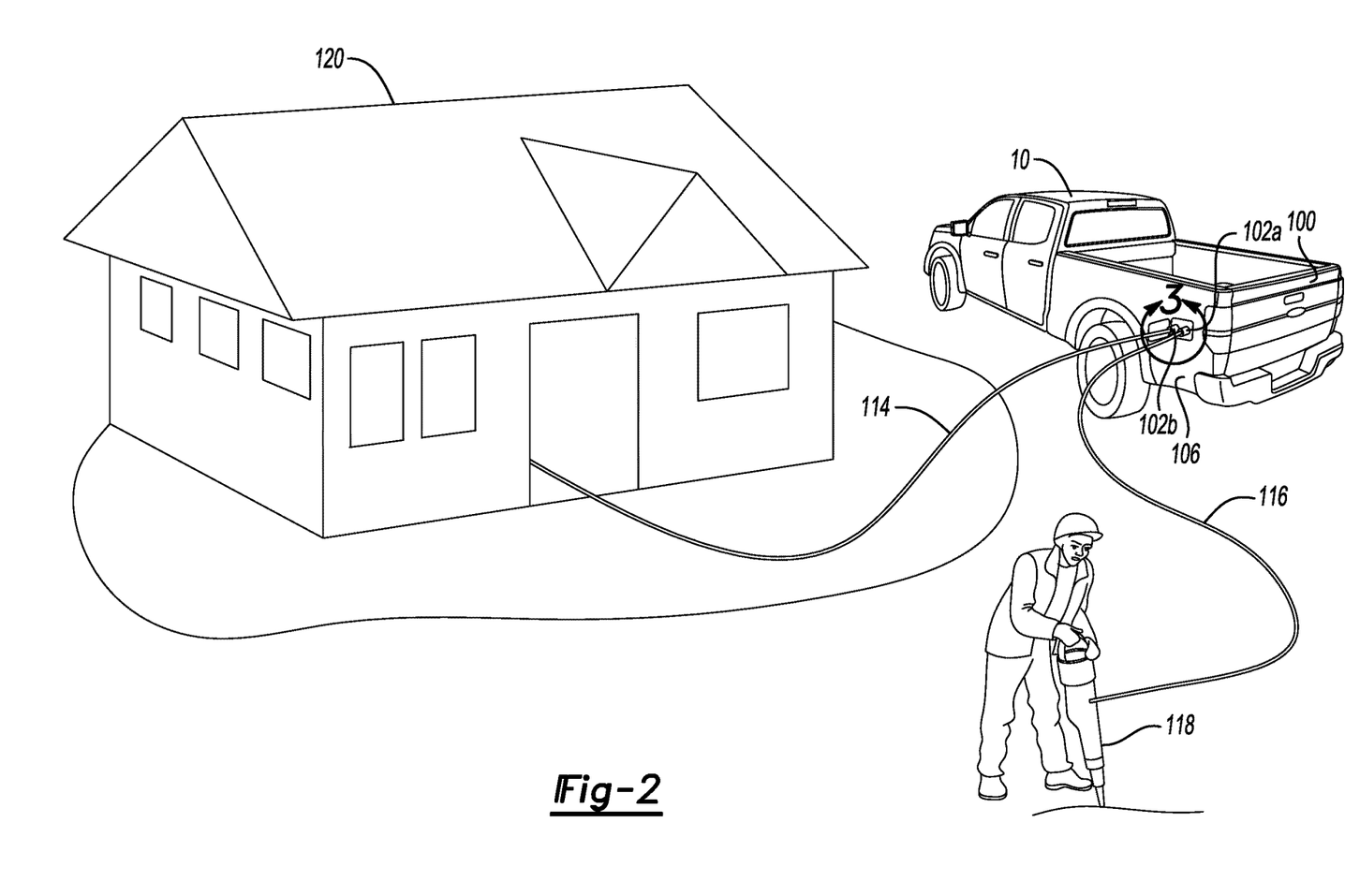
FIG. 2 is a schematic diagram of the hybrid vehicle powering loads with the auxiliary power system.

Referring to FIG. 2, the truck 10 includes an open cargo box 100 having a pair of opposing sidewalls 106 and a tailgate extending between the sidewall. The truck 10 has an auxiliary power system that includes one or more outlets configured to power electrical loads such as power tools. An electrical outlet 102 is disposed on the box 100. For example, the outlet 102 is mounted on an outer surface 104 of the sidewall 106. Alternatively, the outlet 102 may be mounted on the inner surface of the sidewall 106. The electrical outlet 102 may be one more outlets such as the two shown. Each electrical outlet may include a single electrical socket or multiple sockets. The sockets may have different voltage and current ratings so that different loads can be powered by the vehicle 10.

According to one embodiment, the truck 10 only includes a single outlet that has a first socket for V2L and a second socket for V2B. The first and second sockets may be setup so that only one of the first and second sockets can receive an associated connector (plug) at any one time. The receptacle configurations of the first and second sockets may be different so that the first socket can only receive V2L connectors and the second socket can only receive V2B connectors.

According to another embodiment, the truck 10 may include a bank of V2L outlets and a single V2B outlet. The outlet bank may include multiple 120-volt sockets configured to receive a standard wall plug of an electrical load, such as a power tool. (It is to be understood that the voltage rating of the socket is a design voltage and that actual voltage at the socket may be more or less within a tolerance.) In some embodiments, the vehicle 10 may include and one or more 240-volt sockets for powering higher power V2L loads such as a welder, a power saw, an electric pump, and the like. The vehicle may be configured only power the bank of V2L outlets or the V2B outlet at a time.

The electrical outlet(s) 102 is electrically connected to the power-electronics invertor 60. In the illustrated embodiment, the outlet 102 is configured to receive connectors, e.g., extension cords, to power external devices with the truck 10. For example, the truck 10 may power a building 120 using the V2B outlet 102*b* or a power tool 118 using the V2L outlet 102*a*. For illustrative purposes, FIG. 2 shows the vehicle 10 powering both the building 120 and the power tool 118 to highlight capabilities of the vehicle 10, but in practice, the vehicle may be configured to prevent powering V2L and V2B loads simultaneously. That is, the vehicle 10 may include a V2L mode in which power tools and the like may be powered by the vehicle and a V2B mode in which a building may be powered by the vehicle. The truck 10 may also include a V2G mode. The truck may be configured to only power the grid when in V2G mode. A third type of outlet (not shown) may be used for V2G.

The bed outlet(s) 102 is merely an example and the bed outlet may include more or less sockets in other embodiments. Additional outlets may also be provided in other areas of the vehicle 10 such as in the passenger cabin. For example, an outlet may be provided on the front dash, in the front console, and/or in the rear console. The number and type of outlets and sockets may vary based on the power capability of the hybrid powertrain.

The National Electrical Manufacturers Association (NEMA) is an organization that has standardized many of the connectors (plugs) and outlets (receptacles) used in the United States of America. One of the most common AC outlets/connectors is the NEMA 5, which comes in a variety of currents (Amperes) such as 15 A (NEMA 5-15) and 20 A (NEMA 5-20). The NEMA 5-15R is the most common outlet provided in homes and the NEMA 5-15P is most common plug provided on loads. As such, the vehicle may include one or more NEMA 5 outlets. NEMA 5 is merely one of many standardized connectors/outlets that may be provided on the vehicle. Used herein, "standardized" when referring to connector/outlet configurations means a configuration that has been standardized by NEMA.

Figure 3:
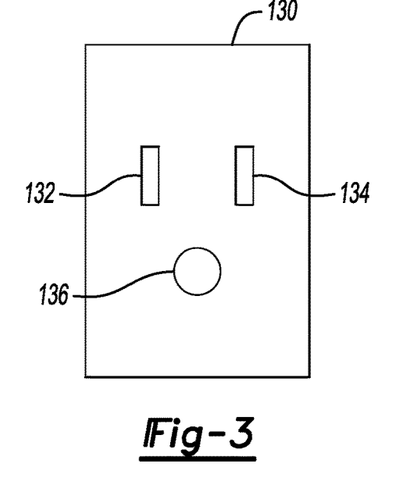
FIG. 3 is a diagrammatical view of a standard electrical outlet.

Referring to FIG. 3, a NEMA 5-15R outlet 130 includes three receptacles, a line (hot) receptacle 132, a neutral receptacle 134, and a ground receptacle 136. These receptacles are configured to receive the prongs of a NEMA 5-15P connector. One or more outlets 130 may be provided on the vehicle 10 to power loads when the vehicle is in V2L mode.

Figure 4:
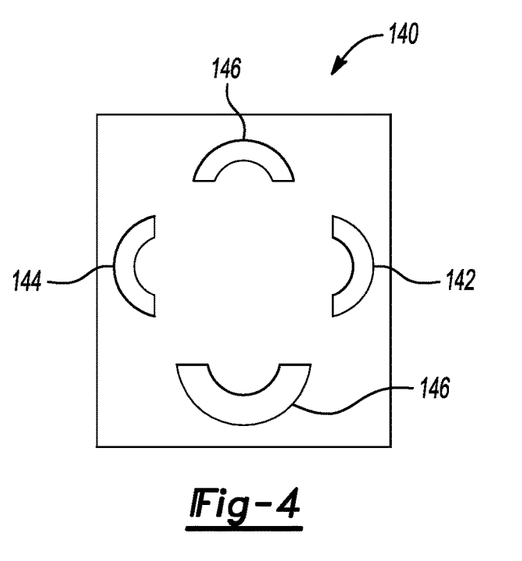
FIG. 4 is a diagrammatical view of a unique electrical outlet.

Referring to FIG. 4, the vehicle 10 may include a unique outlet 140. Used herein, "unique outlet" refers to an outlet/connector that has not been standardized by NEMA. The outlet 140 may include four receptacles, a pair of line receptacles 142, 144, a neutral receptacle 146, and a ground receptacle 148. The shape, size, location, and/or configuration may be unique compared to any standardized outlets. The unique outlet 140 may be used to power a building, i.e., is the outlet used during V2B. The vehicle 10 may only include one unique outlet 140 to prevent a user from attempting to power multiple buildings. The vehicle 10 may be sold with a manufacturer-provided cord for connecting the vehicle 10 to a building using the unique outlet 140. The cord includes a connector having prongs configured to be received within the receptacles of the unique outlet 140. The vehicle manufacturer may also sell a building-connection kit installable onto the building. The kit may include a second unique outlet 146 allowing the cord to electrically connect the vehicle 10 to the building so that the vehicle 10 may act as a mobile generator for powering building. In some embodiments, the cord may include a standard connector on the one end so that it may be received within a standard outlet of a transfer switch provided on the building.

As stated above, V2B loads require grounding to protective earth whereas V2L does not. One way to satisfy the different grounding requirements is to only allow the vehicle to provide V2B or V2L at any one time and to bond and unbond the neutral of the inverter 60 to the vehicle chassis. This disclosure sets forth several different ways for preventing simultaneous use of V2B and V2L. Some solutions relate to the outlet design whereas others relate to the circuitry.

Figure 5:
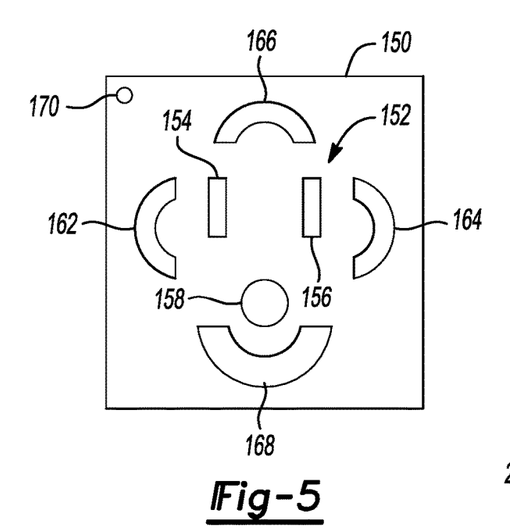
FIG. 5 is a front view of a combined V2L and V2B outlet according to one embodiment.

FIG. 5 illustrates an outlet-based approach for preventing a user from powering V2B and V2L at the same time. According to one embodiment, a combination outlet 150 is provided on the vehicle 10. The combination outlet includes a NEMA outlet plus a unique outlet. The combination outlet 150 is designed so that only one plug may be received at a time. That is, only one of a NEMA connector and a unique connector may be plugged into the outlet 150 at a time. If the outlet 150 is the only outlet provided on the vehicle, it is impossible for a user to simultaneous use of V2B and V2L.

The outlet 150 includes a first, standardized socket configured to power a first category of external loads (e.g., V2L) and a second, non-standardized socket configured to power a second category of external loads (e.g., V2G). A socket refers to an arrangement of receptacles. For example, the outlet 150 includes a first socket 152 having receptacles arranged according to a standardized outlet and configured to receive prongs of a first type of connector that is associated with V2L. In the illustrated embodiment, the first socket 152 has three receptacles 154 (line), 156 (neutral), and 158 (ground) configured as a NEMA 5-15R outlet so that the socket may receive a NEMA 5-15P connector associated with a remote device.

The outlet 150 also includes a second, non-standardized socket 160 having receptacles arranged and configured to receive prongs of a second type of connector that is associated with V2B. In the illustrated embodiment, the second socket 160 has four receptacles 162/164 (line), 166 (neutral), and 168 (ground). The receptacles of the second socket 160 are arranged differently than the first socket 152.

The first and second sockets 152, 160 are positioned on the outlet 150 to overlap such that only one of the first and second connectors can be plugged into the outlet 150 at a time to prevent the inverter 60 from powering the first and second categories of external loads simultaneously. In the illustrated embodiment, the standard socket 152 is circumscribed by the unique socket 160 so that the socket 152 is covered when a connector is disposed in the unique socket 160. Conversely, a standard connector, when plugged into the standard socket 152, is disposed between opposing receptacles e.g., 162, 164, to prevent a unique connector from being plugged into the unique socket 160.

The combination outlet 150 may include a sensor 170 that is configured to detect a connector being plugged into the outlet. The sensor 170 may be associated with only one of the sockets. That is, the sensor 170 may be configured to detect the presence of a connector plugged into the socket 152 but not the socket 160, or the sensor may be configured to detect the presence of a connector plugged into socket 160 but not socket 152. The sensor may be mechanical, optical, radio frequency, infrared and the like. Sensor 170 may be in electronic communication with the controller and configured to output a signal indicative of a connector being plugged into an associated socket.

Figure 6:
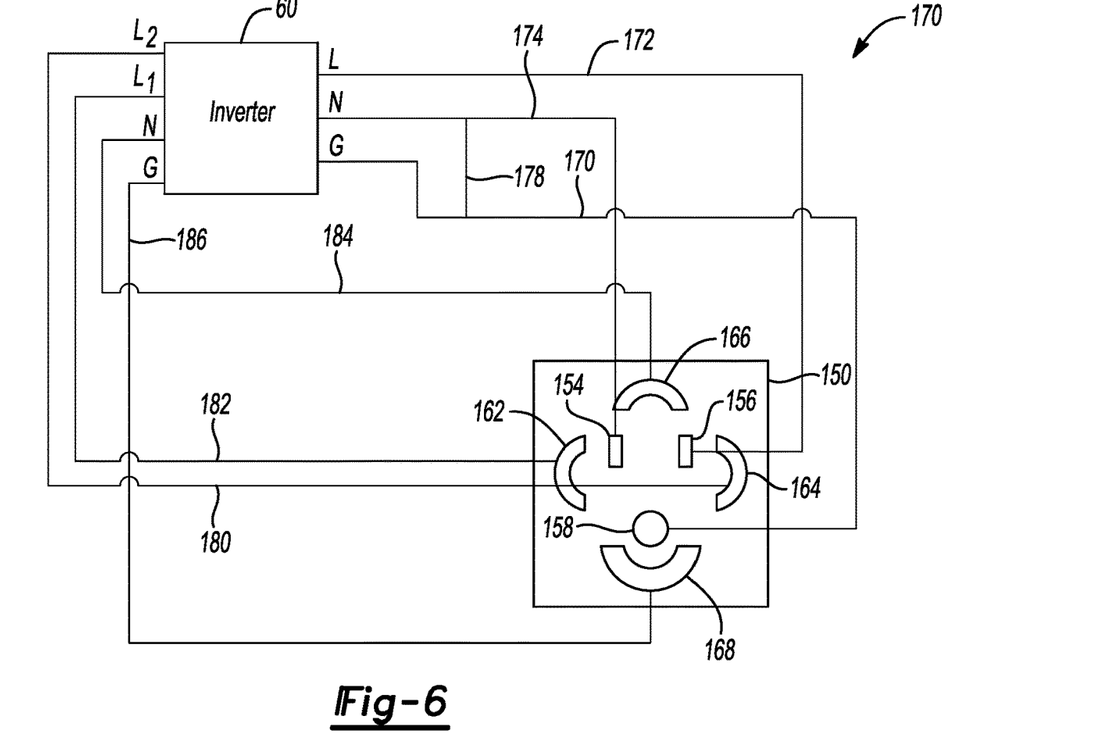
FIG. 6 is a schematic diagram of an auxiliary power system having the combined V2L and V2B outlet of FIG. 5.

FIG. 6 illustrates a circuit connecting the inverter 60 to the outlet 150. The receptacles (line 154, neutral 156, and ground 158) of the first socket 152 may be electrically connected to the inverter 60 by wires 172, 174, and 176, respectively. The neutral wire 174 and the ground wire 176 are connected in the inverter side as shown by 178, e.g., a jumper. The receptacles (line 162, line 164, neutral 166, and ground 168) of the second socket 160 may be electrically connected to the inverter 60 by wires 180, 182, 184, and 186, respectively. The neutral wire 166 and the ground wire 168 are not electrically connected in the inverter side.

Figure 7:
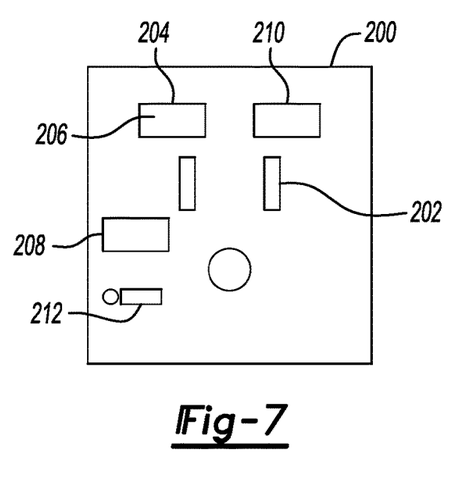
FIG. 7 is a front view of a combined V2L and V2B outlet according to another embodiment.

FIG. 7 illustrates another combination outlet 200 that includes a standard socket 202 and a unique socket 204. The standard socket 202 may be configured as a NEMA 5-15R. The unique socket 204 may include four receptacles, 206/208 (line), 210 (neutral), and 212 (ground). The receptacles of the unique socket 204 may be larger than the receptacles of the standard socket 202. The sockets 202 and 204 are arranged on the outlet 200 so that they overlap to prevent more than one connector from being plugged in at any one time. Unlike the outlet 150, the socket 202 is not circumscribed by the socket 204. Instead, the receptacles of the outlet 204 are generally arranged in an L shape that partially surrounds the socket 202. The receptacles are placed near enough to each other to prevent more than one connector from being inserted. For example, at least one of the receptacles of the standard socket 202 is within 10 millimeters (mm) of at least one of the receptacles of the unique socket 204. In some embodiments the distance may be even less such as 3.0 mm or 5.0 mm. Of course, these are just examples, and the distance between the receptacles will depend upon the shroud size of the connectors, i.e., connectors with a larger footprint can accommodate larger spacing between the receptacles while still preventing connector insertion, as well as other factors. The above-described unique sockets 160 and 204 are merely examples and other arrangements are contemplated. While not shown, the outlet 200 may include a sensor similar to the above-described sensor 170. The outlet 200 may include a circuit the same or similar to FIG. 6.

Figure 8A:
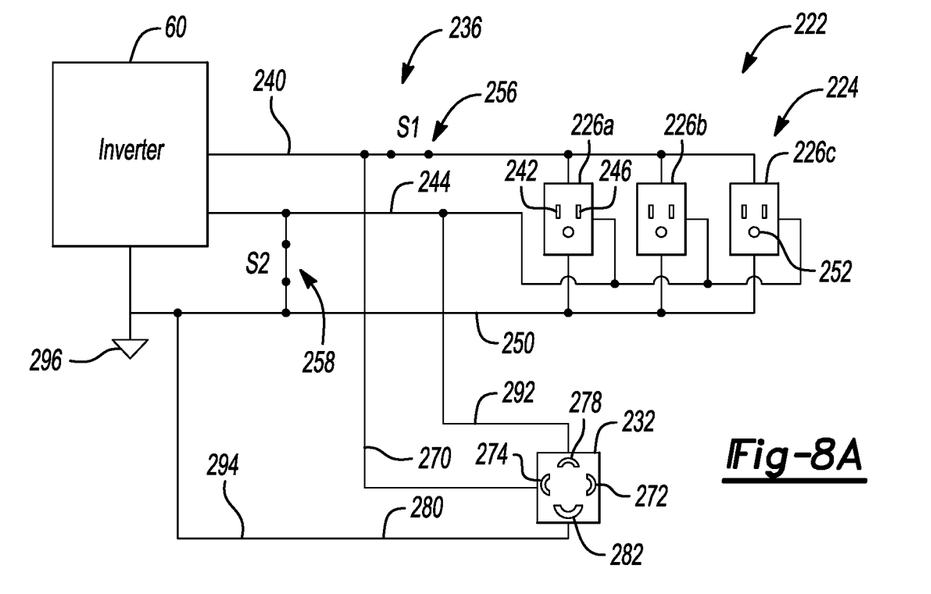
FIG. 8A is a schematic diagram of an auxiliary power system of a vehicle shown in V2L mode.
Figure 8B:
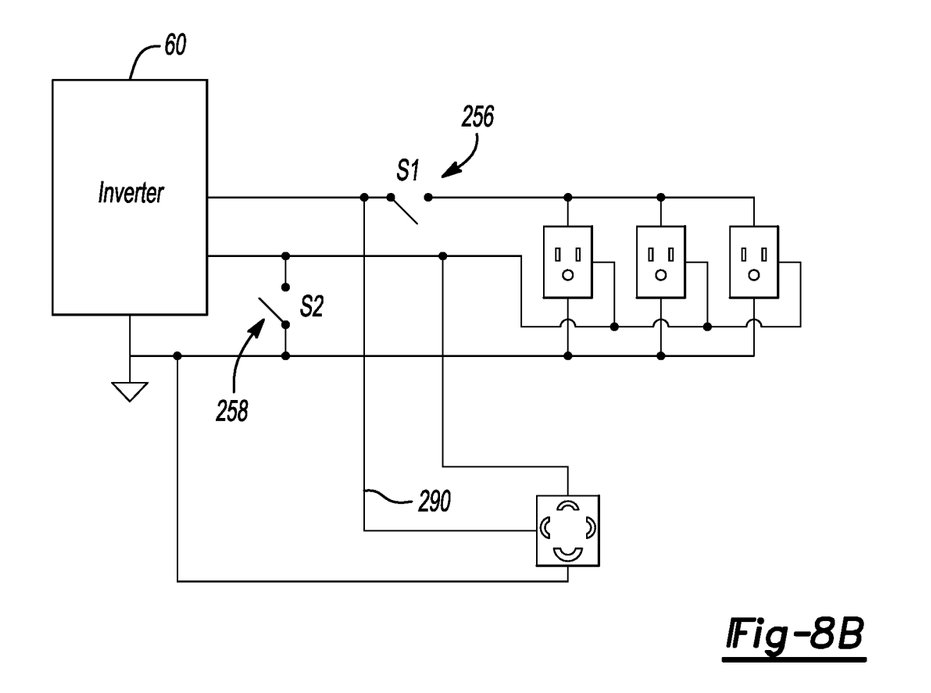
FIG. 8B is a schematic diagram of the auxiliary power system shown in V2B mode.

FIGS. 8A and 8B illustrates a circuit solution for preventing the vehicle from operating in V2L and V2B simultaneously. The vehicle 10 includes a power-electronics inverter 60 electrically connected to an auxiliary power system 222 that may be provided on an outer portion of the vehicle such as the truck box. The inverter 60 is electrically connected to the traction battery 20 and the electric machine 18, which act as power sources for the auxiliary power system 222. The auxiliary power system 222 may include a bank of standard outlets 224, such as the three illustrated NEMA 5-15R outlets 226a, 226b, 226c, for V2L and a single unique outlet 232 for V2B. The auxiliary power system 222 is connected to the inverter 60 by circuitry 236. The circuitry 236 is configured to energize and de-energize one or more of the outlet bank 224 and the unique outlet 232. For example, the circuitry may de-energize the outlet bank 224 responsive to a plug being received within the unique outlet 232. Alternatively or additionally, the circuitry 236 may be configured to de-energize the unique outlet 232 in response to a plug being received within the outlet bank 224.

The circuit 236 may include line 240 connected with the line receptacles 242 of the outlets 226, neutral 244 connected with the neutral receptacles 246 of the outlets 226, and ground 250 connected with the ground receptacles 252 of the outlets 226. A first switch 256 is disposed on the line 240 and is configured to disconnect the line receptacles 242 from the inverter 60 when the switch 256 is in the open position and is configured to connect the line receptacles with the inverter 60 when the switch 256 is in the closed position. A second switch 258 is provided between the ground 250 and the neutral 244 and is configured to electrically connect the neutral 244 and the ground 250 when closed. When the second switch 258 is closed, the neutral of the inverter is bonded to the vehicle chassis 296 and when the second switch 258 is open the inverter neutral is not bonded to the vehicle chassis. Instead, the neutral is bonded to earth ground inside the building premise. The switches 256 and 208 may be in electronic communication with an onboard vehicle controller, such as controller 50. Example switches include mechanical and electronic switches. The controller is programmed to open and close one or more of the switches 256, 258 in order to energize and de-energize the outlet bank 224 and to modify the ground between vehicle ground and earth ground.

The unique outlet 232 includes a pair of line receptacles 272 and 274 connected to the line 240 via a branch 290. The unique outlet 232 also includes a neutral receptacle 278 connected to neutral 244 by a branch 292 and a ground receptacle 282 connected to ground by a branch 294. The branch 290 is located between the inverter 60 and the first switch 256. In this configuration, the unique outlet 232 is unaffected by the operation of the switch 256 and is always energized as long as the inverter 60 has power. The ground branch 294 is disposed between the vehicle ground 296 and the second switch 258.

The circuit 236 may be controlled by the controller 50, which is programmed to operate the switches in order to energize and de-energize the outlet bank 224 as well as modify the grounding depending upon if the inverter 60 is powering a building via the unique outer 232 or a remote device(s) via the outlet(s) 226.

Figure 9:
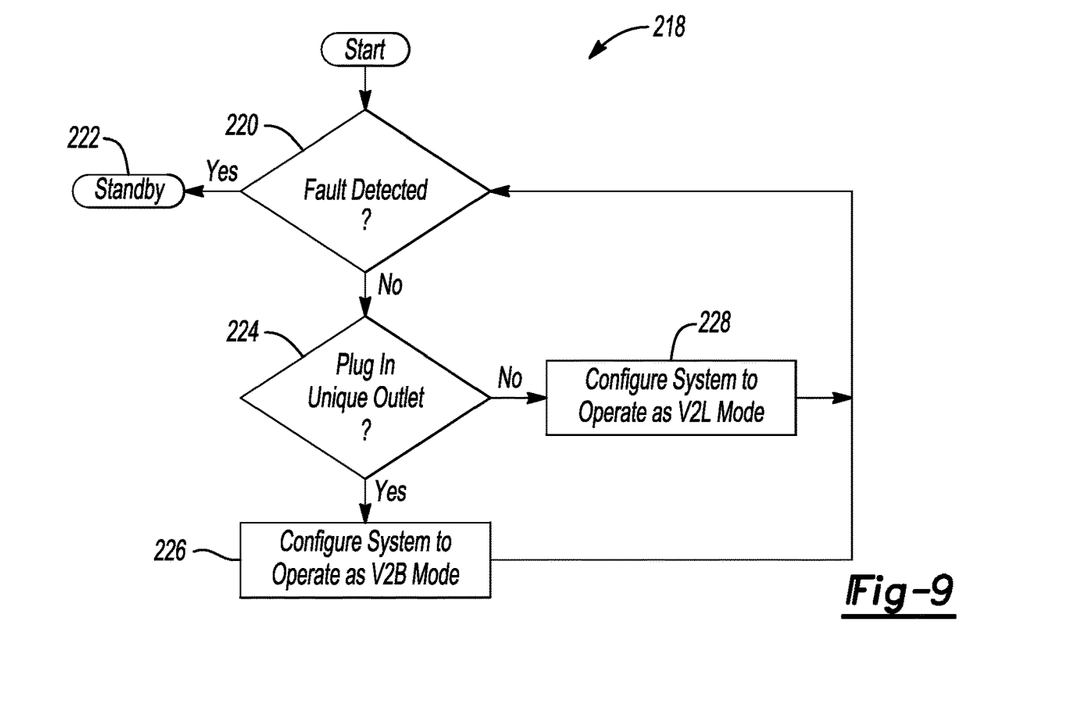
FIG. 9 is a flow chart illustrating an algorithm for operating the auxiliary power system.

FIG. 9 illustrates a flow chart of an algorithm for controlling operation of the circuitry 236 depending upon the type of load being powered by the inverter 60. Control begins at operation 222 where the controller determines if a fault is detected. If yes system enters a standby mode 222. If no, control passes to operation 224 and the controller determines if a connector is received in the unique outlet 232 (V2B). The unique outlet 232 may include a sensor that outputs a signal to the controller indicative of a connector being plugged in. If yes at operation 224, control passes operation 226 and the circuit is configured to operate in V2B mode. Referring to the circuit 236 as an example, the controller, at operation 124, may command the first switch 256 to the open position in order to de-energize the outlet bank 224 associated with V2L mode and may open the second switch so that the unique outlet 232 is grounded to earth.

If no at operation 224, control passes operation 228 and the controller configures the circuit to operate in V2L mode. This may include closing the first switch 256 so that the outlets 226 are energized and closing the second switch so that the neutral of the converter 222 is bonded to the vehicle chassis 296. The first and second switches 256 and 258 may be biased to the closed position.

As described above, one or more of the outlets may include a sensor configured to determine if a connector is present therein. The sensor may be provided on the vehicle outlets as discussed above or may be provided on an outlet of the building configured to receive the electrical cord connecting the vehicle to the building. In this embodiment, the sensor located on the building outlet is configured to wirelessly communicate with the vehicle controller.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a power-electronics converter; and
   an electrical outlet in electric communication with the power-electronics converter and configured to power external loads, the electrical outlet including:
   a first socket configured to power a first category of external loads, the first socket having receptacles arranged to receive prongs of a first type of connector that is associated with the first category of external loads, and
   a second socket configured to power a second category of external loads, the second socket having receptacles arranged differently than the first socket to receive prongs of a second type of connector that is associated with the second category of external loads, wherein the first and second sockets are positioned on the outlet to overlap such that only one of the first and second connectors can be plugged into the outlet at a time to prevent the power-electronics converter from powering the first and second categories of external loads simultaneously.

2. The vehicle of claim 1, wherein the receptacles of the first socket are arranged in a standardized configuration as recognized by the National Electrical Manufacturers Association (NEMA), and the receptacles of the second socket are arranged in a non-standardized configuration.

3. The vehicle of claim 2, wherein the receptacles of the first socket are arranged in a NEMA 5 configuration and the first type of connector is a NEMA 5 connector.

4. The vehicle of claim 2, wherein the first category of external loads includes power tools and the second category of external loads includes buildings.

5. The vehicle of claim 1 further comprising:
   a first set of wires connecting between the power-electronics converter and the first socket; and
   a second set of wires connecting between the power-electronics converter and the second socket.

6. The vehicle of claim 1, wherein the first socket is circumscribed by the second socket.

7. The vehicle of claim 1, wherein at least one of the receptacles of the first socket is within five millimeters of at least one of the receptacles of the second socket.

8. The vehicle of claim 1, wherein the first and second sockets overlap such that at least one of the receptacles of the second socket is covered by the first connector when received in the first socket and such that at least one of the receptacles of the first socket is covered by the second connector when received in the second socket.

9. The vehicle of claim 1, wherein the first socket includes three receptacles, and the second socket includes four receptacles.

10. The vehicle of claim 1, wherein the outlet further includes a sensor configured to detect the presence of one of the first and second connectors in their respective socket.

11. A vehicle comprising:
    a traction battery;
    an electric machine;
    a power-electronics converter configured to transfer power between the traction battery and the electric machine; and an electrical outlet in electric communication with the power-electronics converter and configured to power external loads, the electrical outlet including:
  a National Electrical Manufacturers Association (NEMA) 5 socket configured to power loads of remote devices, and
  a unique socket configured to power a building, wherein the NEMA 5 socket and the unique socket are positioned on the outlet to overlap such that only one plug is receivable into the outlet at a time to prevent the power-electronics converter from powering remote devices and buildings simultaneously.

12. The vehicle of claim 11, wherein the NEMA 5 socket is circumscribed by the unique socket.

13. The vehicle of claim 11, wherein the NEMA 5 socket includes three receptacles, and the unique socket includes four receptacles.

14. The vehicle of claim 13, wherein two of the four receptacles are line receptacles.

15. The vehicle of claim 11, wherein the NEMA 5 socket is grounded to the vehicle, and the unique socket is grounded to earth.

16. A vehicle comprising:
traction battery;
an electric machine;
a power-electronics converter configured to transfer power between the traction battery and the electric machine;
a first outlet configured to power a building with the converter;
a second outlet configured to power a remote device with the converter;
a controller programmed to,
  responsive to a plug being inserted into the first outlet, de-energize the second outlet and connect the first outlet to earth ground, and
  responsive to the plug being removed from the first outlet, energize the second outlet and connect the second outlet to vehicle ground.

17. The vehicle of claim 16 further comprising switching circuitry between the converter and the outlets and including at least one switch, wherein the controller opens the switch to de-energize the second outlet.

18. The vehicle of claim 16 further comprising:
circuitry including line, neutral, and ground between the converter and the outlets; and
a first switch electrical connecting the neutral to the ground when closed, wherein the controller commends the first switch closed to connect the second outlet to vehicle ground and commends the first switch open to connect the first outlet to earth ground.

19. The vehicle of claim 18 further comprising a second switch on the line and configured to energize the second outlet when closed and de-energize the second outlet when open.

20. The vehicle of claim 16 further comprising a sensor configured to output a signal to the controller indicative of a plug being inserted into the first outlet.

* * * * *